L. F. BETTS.
GAS HEATER.
APPLICATION FILED MAR. 25, 1910.
1,028,666.
Patented June 4, 1912.
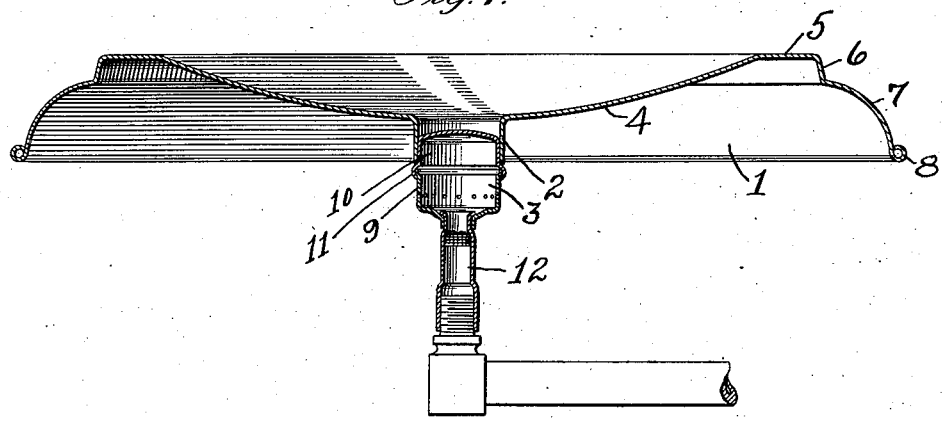
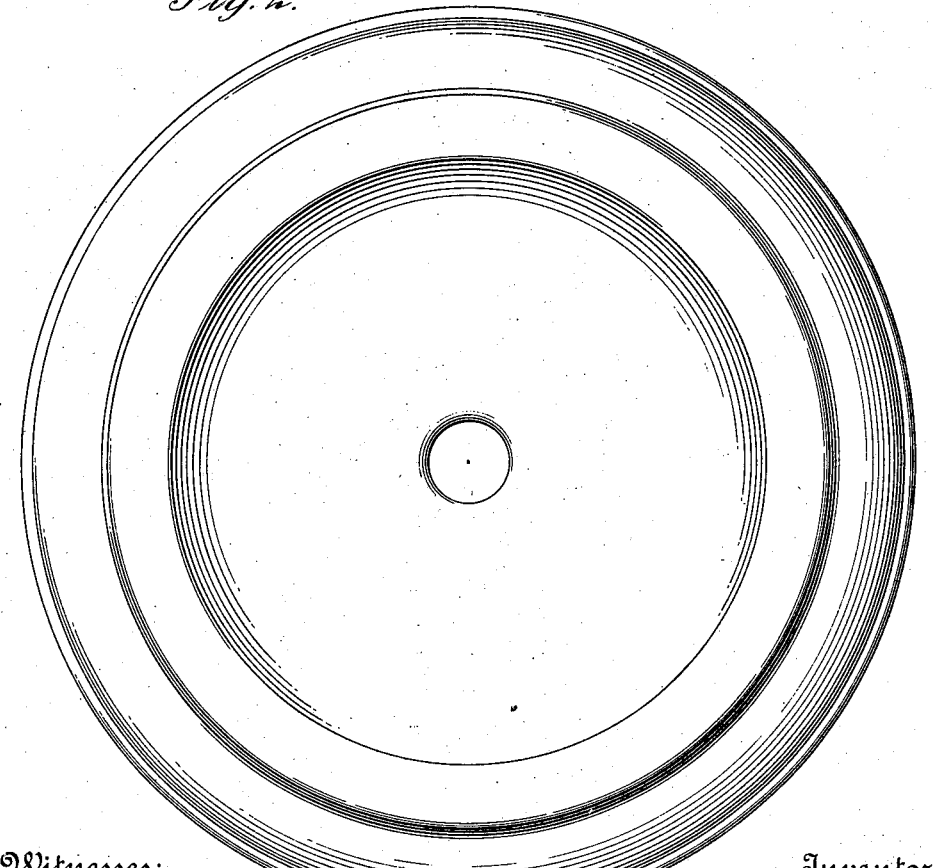

UNITED STATES PATENT OFFICE.

LEWIS F. BETTS, OF NEW YORK, N. Y., ASSIGNOR TO ABBOT A. LOW, OF HORSE-SHOE, NEW YORK, AND MAURICE J. WOHL AND HARRY HERTZBERG, OF BROOKLYN, NEW YORK, TRUSTEES.

GAS-HEATER.

1,028,666.  Specification of Letters Patent.  Patented June 4, 1912.

Application filed March 25, 1910. Serial No. 551,412.

*To all whom it may concern:*

Be it known that I, LEWIS F. BETTS, a citizen of the United States, and resident of the city of New York, borough of Brooklyn, county of Kings, and State of New York, have invented certain new and useful Improvements in Gas-Heaters, of which the following is a specification.

This invention relates to gas heaters adapted for use with a gas burner using the ordinary illuminating gas.

The object of this invention is to provide a device of simple construction which may be easily and cheaply manufactured and which shall be efficient in cases where a small amount of heat is required.

In carrying out my invention I provide a device formed of a single sheet of metal in which, by reason of the peculiar shape, the desired results are produced in a very simple and efficient manner.

A further object of the invention resides in the peculiar relation of the differently shaped portions of the device which enables the same to be packed or nested together so as to occupy the minimum amount of space for shipment. This feature also affords an additional protection of the device against damage in shipment and materially reduces the labor and cost of packing.

Figure 1 is a sectional view of a gas heater embodying my invention. Fig. 2 is a plan view of Fig. 1.

The heating device shown in the drawing comprises an inverted dish-shaped member 1, preferably constructed of sheet metal. This member 1 is provided at its central portion with a cylindrical projecting portion 2, which is preferably slightly tapered so that when several of these devices are placed together in packing these portions will fit one into the other. This cylindrical projecting portion 2 fits over the shell of the burner 3 and provides a support and means of attachment to the burner. From this central portion 2 the heater is flared out and upwardly, as shown at 4, and terminates in a flat horizontal section 5. From the outer edge of this flat horizontal section 5 the heater is formed with a downwardly extending lip 6, from the lower edge of which extends an outwardly and downwardly curved portion 7, terminating in a rolled edge 8 to provide the necessary rigidity to the structure.

The burner 3 is of peculiar construction, being provided with a chamber formed by cup-shaped members 9 and 10. These cup-shaped members 9 and 10 are formed with beaded portions around the adjoining edges thereof, one of which is pressed or spun over the other to secure the same together. This annular projection or bead 11 upon the upper cup-shaped member 10 also provides a stop and support against which the cylindrical portion 2 of the heater is positioned and which assists in holding the same in a horizontal position. The lower portion of the burner 3 is provided with a tubular connection 12 for connecting the same to an ordinary gas fixture in the manner shown in Fig. 1. A number of small orifices are provided in the lower cup-shaped member 9, through which the gas passes and, when lighted, form a number of radially projecting jets which, on account of the upwardly and outwardly flaring portion 4 of the heater, are drawn out by the current of air, which follows this curved portion of the heater, in radially extending and upwardly curving flames which produce an intense heat. The construction of this burner is the same as shown in my co-pending application filed contemporaneously herewith under Ser. No. 551,413, filed March 25, 1910.

The currents of heated air first follow the curved portion 4 and the flat portion 5 of the heater and are then drawn sharply downwardly by the depending portion 6 and are then allowed to spread downwardly and outwardly, following the downwardly curved portion 7 of the heater. The heated air is thus concentrated to a certain extent and forced downwardly into the room.

Many experiments have been made with this form of heater, using various combinations of curved surfaces, and the one herein shown and described has been found to give very efficient results. If the gas jets are lighted before the heater is placed in position on the burner the same will extend outwardly only a short distance, but immediately upon placing the heater in position on the burner the jets are drawn out to a greatly increased length, thus showing conclusively the operation of the air currents just described. The effect of these air currents is not only to extend the flames of the gas burner, but insures a continuous and fresh supply of oxygen for combustion, thus producing a more intense heat for the same gas consumption.

While the form of heater herein shown and described is believed to be the most efficient, I do not wish to be understood as limiting myself to the exact form shown, as it is possible to produce heaters of this type which may be modified somewhat in the various details of construction and it is intended that this particular form shown shall be considered as illustrative of such embodiments of the invention as may come within the scope of the appended claim and not in a limiting sense.

What I claim is:

A burner of the class described comprising a hollow body forming a reservoir adapted to receive gas accumulated under pressure therein, said body consisting of upper and lower cup-shaped members, the open end portions of which are formed with annular pressed-out projections engaging one another concentrically to thereby connect the two members of the body together so that the upper member forms a closure for the upper end of the lower member, the lower member being provided with a plurality of orifices in its sides forming radially extending jets and said jets being unobstructed so as to permit burning of the gas as it issues therefrom without previous admixture with air.

Signed at Brooklyn, N. Y., in the county of Kings and State of New York, this 23rd day of March, 1910.

LEWIS F. BETTS.

Witnesses:
H. HERTZBERG,
GEO. WELLING GIDDINGS.

Copies of this patent may be obtained for five cents each, by addressing the "Commissioner of Patents, Washington, D. C."